(12) United States Patent
Hwang et al.

(10) Patent No.: US 10,932,247 B2
(45) Date of Patent: Feb. 23, 2021

(54) METHOD FOR CONFIGURING DOWNLINK CONTROL REGION IN WIRELESS COMMUNICATION SYSTEM AND DEVICE FOR SAME

(71) Applicant: LG Electronics Inc., Seoul (KR)

(72) Inventors: Daesung Hwang, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/346,277

(22) PCT Filed: Oct. 27, 2017

(86) PCT No.: PCT/KR2017/011993
§ 371 (c)(1),
(2) Date: Apr. 30, 2019

(87) PCT Pub. No.: WO2018/084499
PCT Pub. Date: May 11, 2018

(65) Prior Publication Data
US 2019/0261330 A1 Aug. 22, 2019

Related U.S. Application Data

(60) Provisional application No. 62/417,268, filed on Nov. 3, 2016.

(51) Int. Cl.
*H04L 5/00* (2006.01)
*H04W 72/04* (2009.01)

(52) U.S. Cl.
CPC ............ *H04W 72/042* (2013.01); *H04L 5/00* (2013.01); *H04W 72/044* (2013.01); *H04W 72/0406* (2013.01)

(58) Field of Classification Search
CPC ....... H04L 1/0038; H04L 5/00; H04L 5/0053; H04L 5/0064; H04L 5/0092; H04W 72/042; H04W 72/044; H04W 72/0406
See application file for complete search history.

(56) References Cited

U.S. PATENT DOCUMENTS 8,626,218 B2 * 1/2014 Wang .................... H04L 47/283
455/509
8,675,565 B2 * 3/2014 Kim ........................ H04L 5/001
370/328

(Continued)

OTHER PUBLICATIONS

LG Electronics, "Discussions on sPDCCH for latency reduction", 3GPP TSG RAN WG1 Meeting #86bis, Oct. 10-14, 2016, R1-1609214.

(Continued)

*Primary Examiner* — Alpus Hsu
(74) *Attorney, Agent, or Firm* — Dentons US LLP

(57) ABSTRACT

A method for receiving a downlink control channel by a user equipment (UE) in a wireless communication system is disclosed. The method includes receiving downlink control information (DCI) indicating an aggregation level being a reference for allocating a downlink data channel to a control region, determining a last control channel element (CCE) index to which the downlink control channel is allocated, based on the received DCI, configuring a downlink control channel transmission region in consideration of the last CCE index and a resource region for one or more downlink control channel candidates corresponding to the aggregation level, and configuring a remaining control region except for the downlink control channel transmission region as a downlink data channel transmission region, and receiving the downlink control channel and the downlink data channel in the control region, based on the configured downlink control channel transmission region and the configured downlink data channel transmission region.

10 Claims, 12 Drawing Sheets

(a) 1 TX or 2 TX (b) 4 TX

(56) References Cited

U.S. PATENT DOCUMENTS

| | | | | |
|---|---|---|---|---|
| 8,843,168 B2* | 9/2014 | Wang | ................ | H04W 72/0446 |
| | | | | 455/509 |
| 9,019,922 B2* | 4/2015 | Oizumi | ................ | H04L 5/0053 |
| | | | | 370/329 |
| 9,100,955 B2* | 8/2015 | Nakao | ................ | H04L 5/0032 |
| 9,107,162 B2* | 8/2015 | Zhu | ................ | H04W 52/0225 |
| 9,137,796 B2* | 9/2015 | Yang | ................ | H04W 72/0446 |
| 9,191,943 B2* | 11/2015 | Park | ................ | H04L 5/0053 |
| 9,191,945 B2* | 11/2015 | Seo | ................ | H04L 5/0092 |
| 9,237,571 B2* | 1/2016 | Saito | ................ | H04L 5/001 |
| 9,247,562 B2* | 1/2016 | Kim | ................ | H04L 5/001 |
| 9,344,259 B2* | 5/2016 | Love | ................ | H04L 5/003 |
| 9,345,013 B2* | 5/2016 | Seo | ................ | H04L 5/0055 |
| 9,386,487 B2* | 7/2016 | Zhu | ................ | H04W 28/08 |
| 9,408,204 B2* | 8/2016 | Takeda | ................ | H04L 5/0053 |
| 9,419,764 B2* | 8/2016 | Oizumi | ................ | H04W 72/042 |
| 9,455,812 B2* | 9/2016 | Liu | ................ | H04W 72/1273 |
| 9,591,642 B2* | 3/2017 | Wang | ................ | H04L 5/001 |
| 9,603,095 B2* | 3/2017 | Zhu | ................ | H04W 52/0225 |
| 9,706,569 B2* | 7/2017 | Nakao | ................ | H04L 5/0094 |
| 9,723,606 B2* | 8/2017 | Seo | ................ | H04L 1/1861 |
| 9,843,429 B2* | 12/2017 | Yi | ................ | H04W 4/70 |
| 9,854,573 B2* | 12/2017 | Park | ................ | H04W 72/14 |
| 9,907,064 B2* | 2/2018 | Saito | ................ | H04W 72/042 |
| 10,027,460 B2* | 7/2018 | McBeath | ................ | H04L 5/0053 |
| 2011/0292891 A1* | 12/2011 | Hsieh | ................ | H04L 1/0061 |
| | | | | 370/329 |
| 2013/0336252 A1* | 12/2013 | Hsieh | ................ | H04W 72/042 |
| | | | | 370/329 |
| 2015/0003425 A1* | 1/2015 | Kim | ................ | H04L 5/0055 |
| | | | | 370/336 |
| 2015/0029984 A1 | 1/2015 | Wang | | |
| 2015/0282129 A1* | 10/2015 | Takeda | ................ | H04L 27/2643 |
| | | | | 370/329 |
| 2018/0376464 A1* | 12/2018 | Hosseini | ................ | H04L 5/0094 |

OTHER PUBLICATIONS

Nokia, Alcatel-Lucent Shanghai Bell, "On design of search space for short PDCCH", 3GPP TSG-RAN WG1 Meeting #86bis, Oct. 10-14, 2016, R1-1609324.

ZTE, ZTE Microelectronics, "Discussion on sPDCCH for sTTI", 3GPP TSG RAN WG1 Meeting #86bis, Oct. 10-14, 2016, R1-1609341.

Ericsson, "sPDCCH search space design", 3GPP TSG-RAN WG1 #86 bis, Oct. 10-14, 2016, R1-1610322.

* cited by examiner

--Prior Art--

FIG. 2
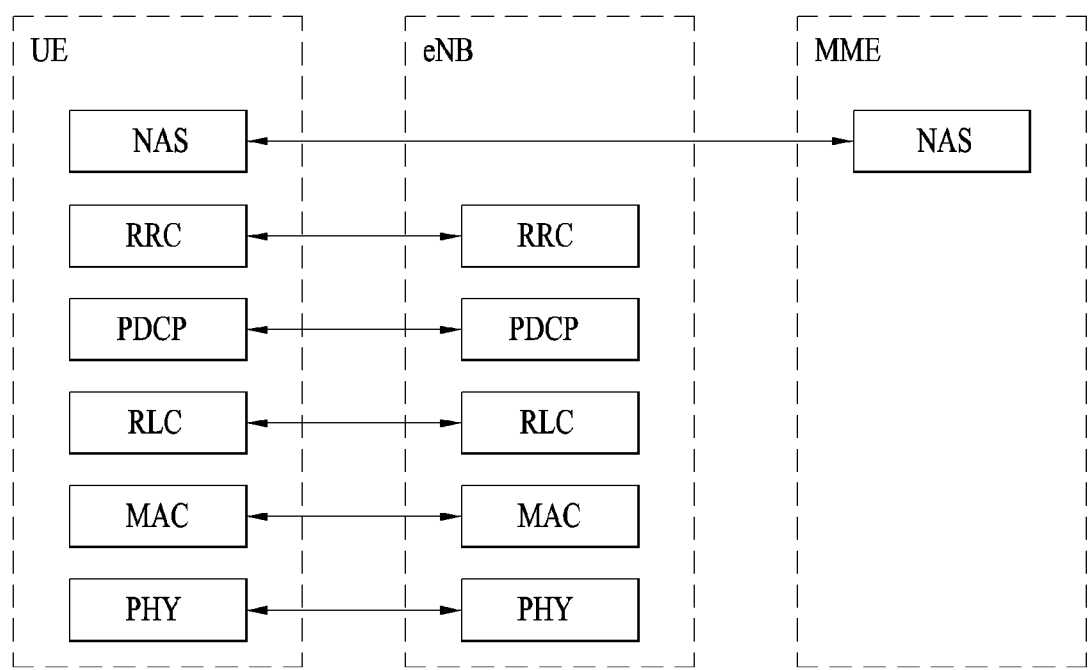
(A) CONTROL-PLANE PROTOCOL STACK
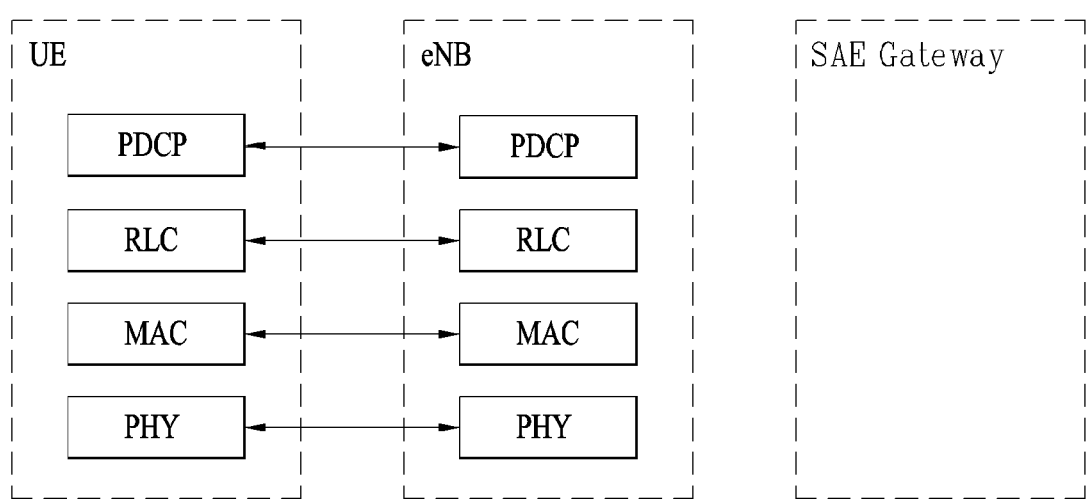
(B) USER-PLANE PROTOCOL STACK FIG. 6
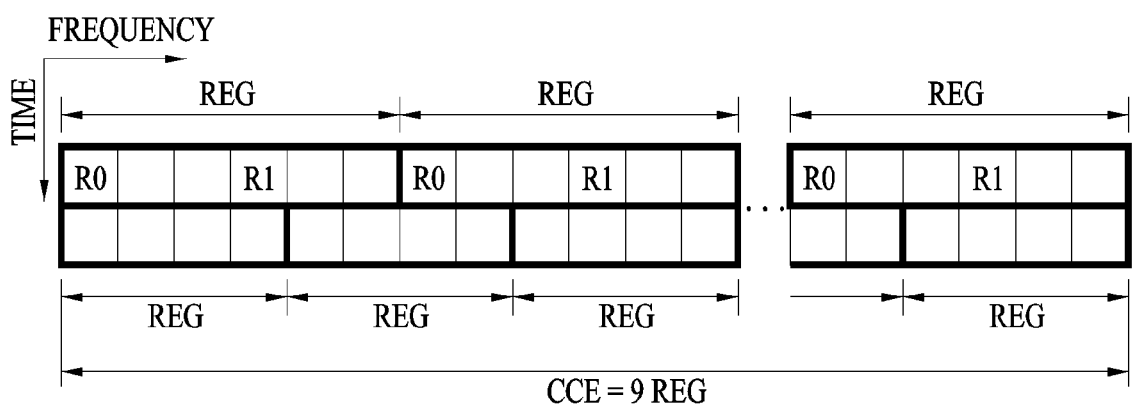
(a) 1 TX or 2 TX
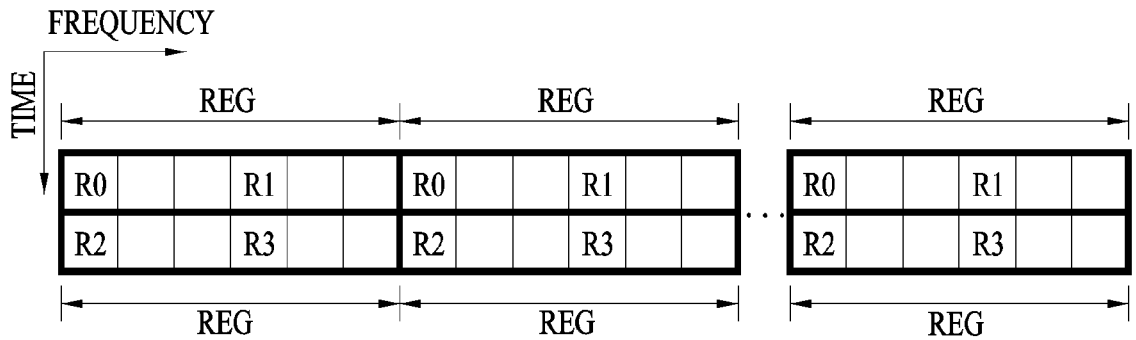
(b) 4 TX FIG. 9
L = 1 
L = 2 
L = 4 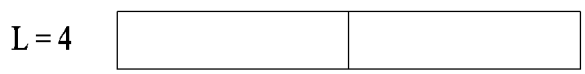
L = 8 

FIG. 10
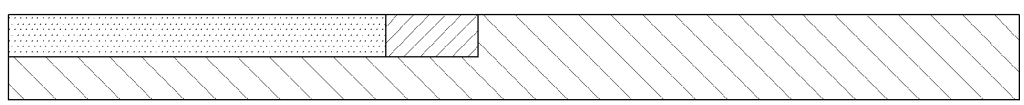
(a)
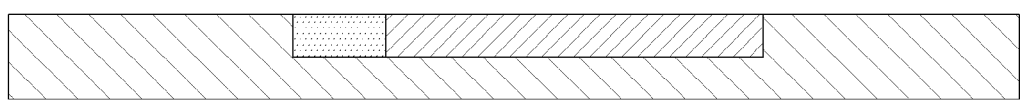
(b)
(c)
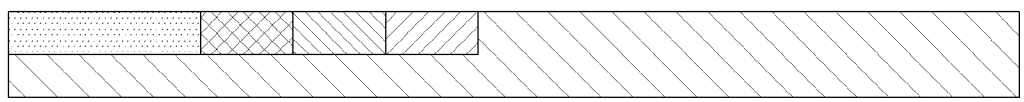
(d)

FIG. 11
L = 1 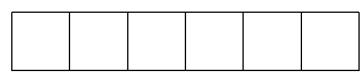
L = 2 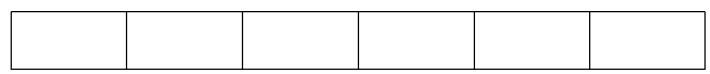
L = 4 
L = 8 

METHOD FOR CONFIGURING DOWNLINK CONTROL REGION IN WIRELESS COMMUNICATION SYSTEM AND DEVICE FOR SAME

This application is a National Stage Entry of International Application No. PCT/KR2017/011993, filed on Oct. 27, 2017, which claims the benefit of U.S. Patent Application No. 62/417,268, filed on Mar. 11, 2016 Mar. 11, 2016, which is hereby incorporated by reference as if fully set forth herein.

BACKGROUND OF THE INVENTION

Field of the Invention

The present disclosure relates to a method and apparatus for configuring a DownLink (DL) control region in a wireless communication system, and more particularly, to a method and apparatus for mapping a shortened Physical Downlink Shared Channel (sPDSCH) and configuring a shortened Physical Downlink Control Channel (sPDCCH) candidate region in a shortened Transmission Time Interval (sTTI).

Discussion of the Related Art

A brief description will be given of a 3rd Generation Partnership Project Long Term Evolution (3GPP LTE) system as an example of a wireless communication system to which the present disclosure can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

An aspect of the present disclosure is to provide a method and apparatus for configuring a DownLink (DL) control region in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the present disclosure, as embodied and broadly described herein, a method for receiving a downlink control channel by a User Equipment (UE) in a wireless communication system includes receiving Downlink Control Information (DCI) indicating an aggregation level being a reference for allocating a downlink data channel to a control region, determining a last Control Channel Element (CCE) index to which the downlink control channel is allocated, based on the received DCI, configuring a downlink control channel transmission region in consideration of the last CCE index and a resource region for one or more downlink control channel candidates corresponding to the aggregation level, and configuring a remaining control region except for the downlink control channel transmission region as a downlink data channel transmission region, and receiving the downlink control channel and the downlink data channel in the control region, based on the configured downlink control channel transmission region and the configured downlink data channel transmission region.

A starting position of the downlink control channel transmission region may be the same irrespective of aggregation levels.

A position of a center of the downlink control channel transmission region may be the same irrespective of aggregation levels.

The DCI may further include the last CCE index.

The last CCE index included in the DCI may be one of one or more preset candidate CCE indexes, indicated by higher-layer signaling.

The last CCE index may be one of CCE indexes of a downlink control channel including the DCI.

In another aspect of the present disclosure, a UE for receiving a downlink control channel in a wireless communication system includes a Radio Frequency (RF) unit configured to transmit and receive wireless signals to and from a base station, and a processor connected to the RF unit, and configured to receive DCI indicating an aggregation level being a reference for allocating a downlink data channel to a control region, to determine a last CCE index to which the downlink control channel is allocated, based on the received DCI, to configure a downlink control channel transmission region in consideration of the last CCE index and a resource region for one or more downlink control channel candidates corresponding to the aggregation level, and configuring a remaining control region except for the downlink control channel transmission region as a downlink data channel transmission region, and to receive the downlink control channel and the downlink data channel in the control region, based on the configured downlink control channel transmission region and the configured downlink data channel transmission region.

A starting position of the downlink control channel transmission region may be the same irrespective of aggregation levels.

A position of a center of the downlink control channel transmission region may be the same irrespective of aggregation levels.

The DCI may further include the last CCE index.

The last CCE index included in the DCI may be one of one or more preset candidate CCE indexes, indicated by higher-layer signaling.

The last CCE index may be one of CCE indexes of a downlink control channel including the DCI.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 2 is a view illustrating a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

FIG. 6 is a view illustrating a resource unit used to configure a DL control channel;

FIGS. 9, 10, and 11 are views illustrating examples for configuration of resource according to embodiments of the present invention.

DETAILED DESCRIPTION OF THE INVENTION

Figure 1:
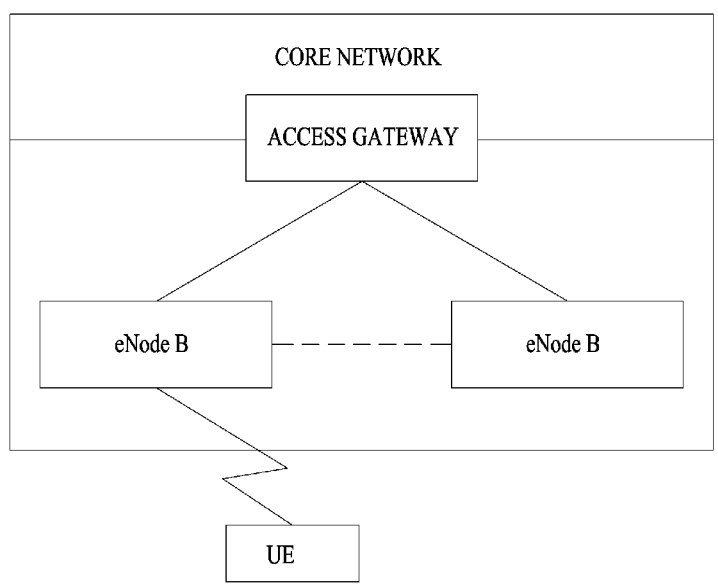
FIG. 1 is a view illustrating a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present disclosure is described based on an LTE system and an LTE-A system in this specification, the LTE system and the LTE-A system are only exemplary and may be applied to all systems corresponding to the aforementioned definition.

Further, while embodiments of the present disclosure are described in the context of Frequency Division Duplex (FDD), this is exemplary. Thus, the embodiments of the present disclosure may readily be modified and applied to Half-Frequency Division Duplex (H-FDD) or Time Division Duplex (TDD), as well.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-1-DMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an eNB is configured to operate in a bandwidth of 1.25, 2.5, 5, 10, 15, or 20 Mhz and provides a DL or UL transmission service to a plurality of UEs in the bandwidth. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
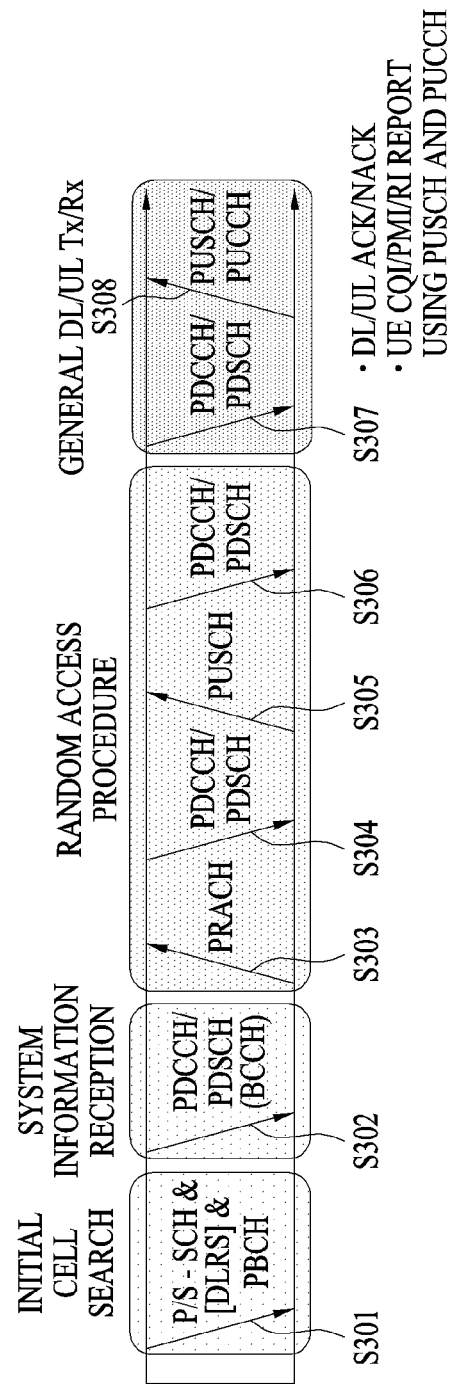
FIG. 3 is a view illustrating physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
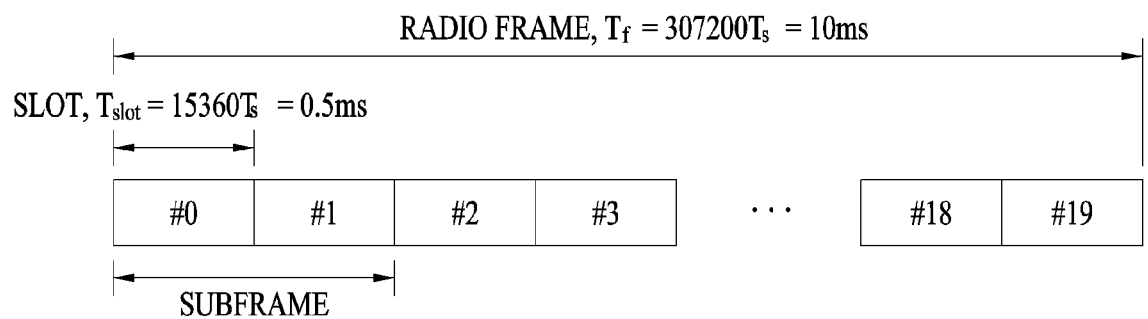
FIG. 4 is a view illustrating a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
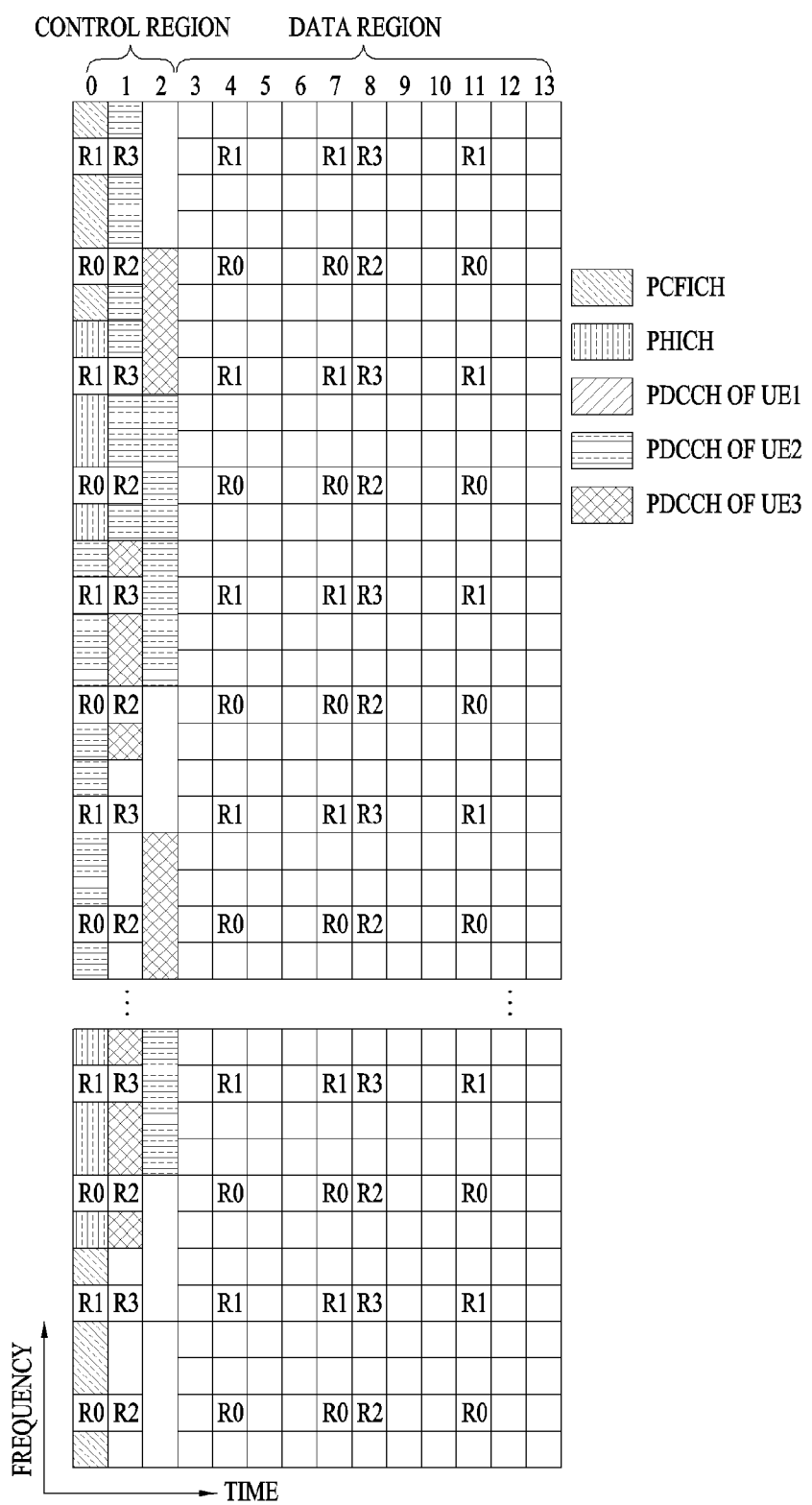
FIG. 5 is a view illustrating a structure of a DownLink (DL) radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 6 illustrates resource units used to configure a DL control channel in LTE. FIG. 6(a) shows a case in which the number of transmit (Tx) antennas is 1 or 2 and FIG. 6(b) shows a case in which the number of Tx antenna is 4. Although a different RS pattern is used according to the number of Tx antennas, REs are configured for a DL control channel in the same manner.

Referring to FIG. 6, a basic resource unit of a DL control channel is an REG The REG includes four contiguous REs except for REs carrying RSs. REGs are marked with bold lines in FIG. 6. A PCFICH and a PHICH include 4 REGs and 3 REGs, respectively. A PDCCH is configured in units of a Control Channel Element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
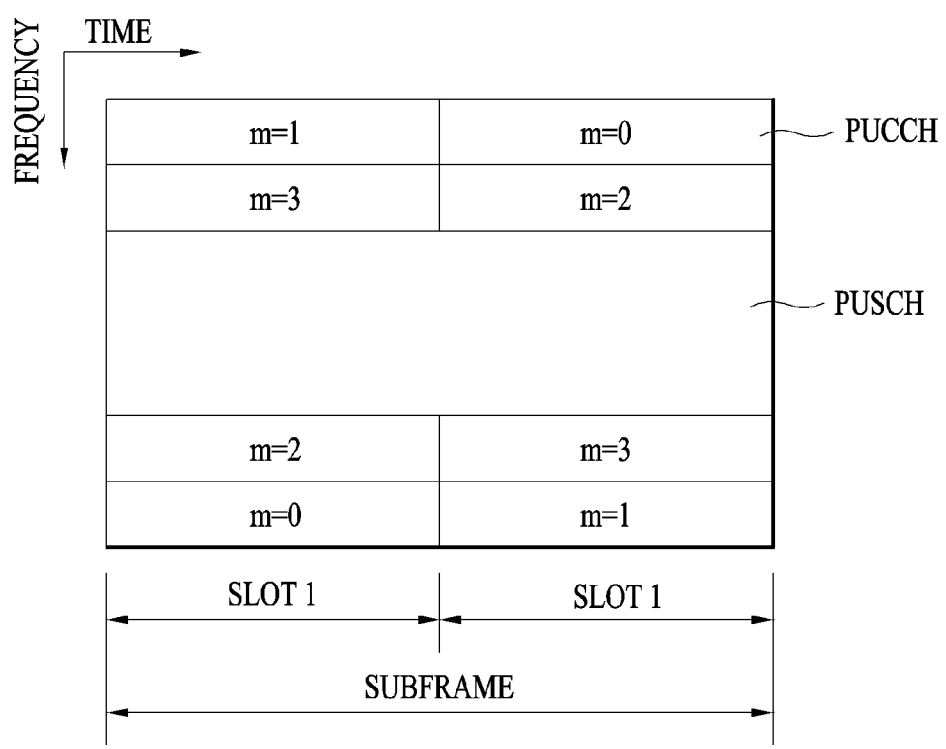
FIG. 7 is a view illustrating a structure of an UpLink (UL) subframe in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a DL channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

Figure 8:
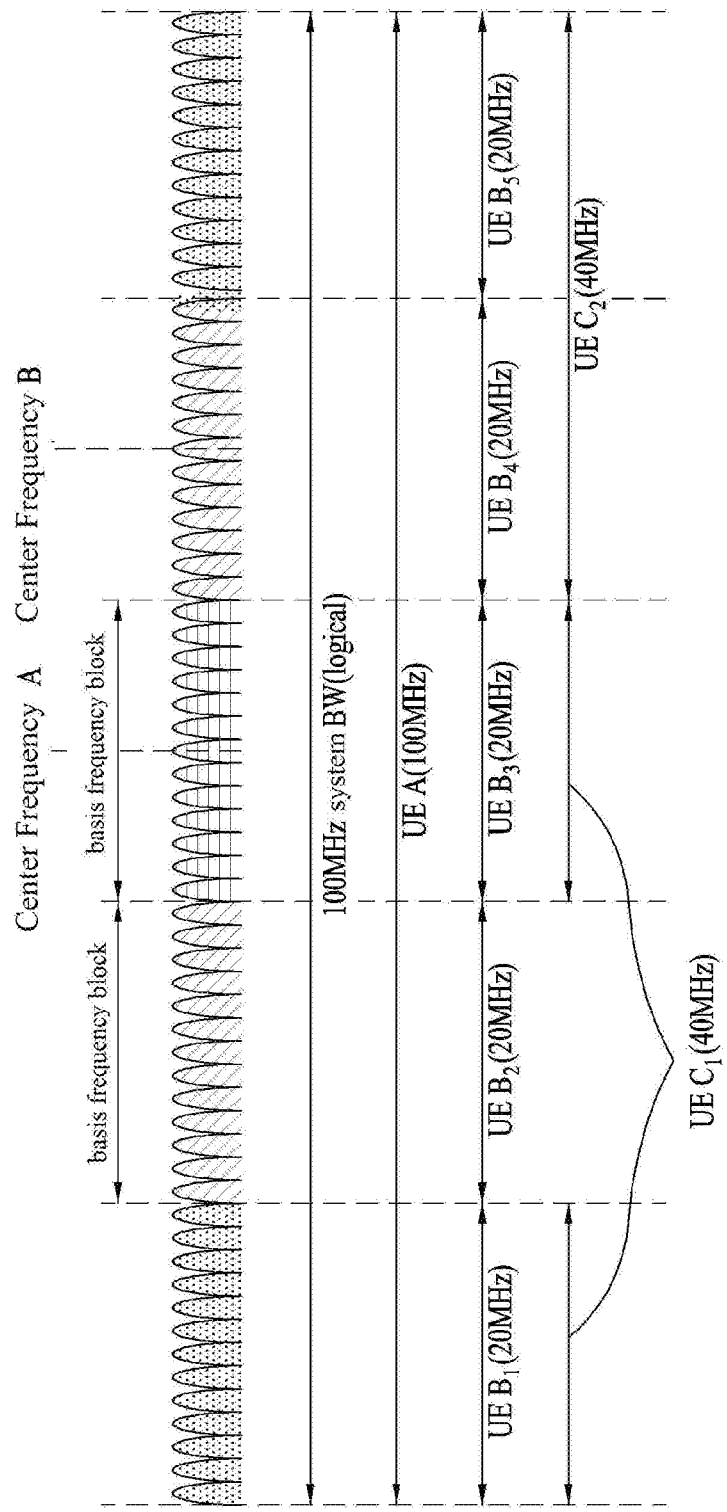
FIG. 8 is a conceptual view illustrating Carrier Aggregation (CA)

FIG. 8 illustrates Carrier Aggregation (CA).

CA refers to a scheme in which a UE uses a plurality of frequency blocks or (logical) cells composed of UL resources (or Component Carriers (CCs)) and/or DL resources (or CCs) as one wider logical frequency band. According to carrier aggregation, a wireless communication can use a use a wider frequency band. Resources are represented by the term "CC" for convenience of description in the following.

Referring to FIG. 8, a system BandWidth (BW) is a logical band having a bandwidth of up to 100 MHz. The system bandwidth includes 5 component carriers each of which has a bandwidth of up to 20 MHz. A component carrier includes one or more physically contiguous subcarriers. While the CCs have the same bandwidth in FIG. 7, the CCs may have different bandwidths. Furthermore, while the CCs are contiguous in the frequency domain, FIG. 8 illustrates the logical concept and thus the CCs may be physically contiguous or separated.

Different center frequencies may be respectively used for the CCs or a common center frequency may be used for physically contiguous CCs. For example, if all CCs are physically contiguous in FIG. 7, then a center frequency A can be used. When the CCs are not physically contiguous, center frequencies A and B may be used.

A CC may correspond to the system bandwidth of a legacy system in the specification. It is possible to easily provide backward compatibility and facilitate system design in a wireless communication environment in which an enhanced UE and a legacy UE coexist by defining the CC on the basis of the legacy system.

When total system bandwidth is extended according to carrier aggregation, 100 MHz can be used for communication with each UE and communication is performed using all 5 CCs. UEs $B_1$ to $B_5$ may use only the bandwidth of 20 MHz and perform communication using one CC. UEs $C_1$ and $C_2$ may use 40 MHz and performs communication using two CCs, respectively. These two CCs may be logically/physically contiguous or noncontiguous. UE $C_1$ corresponds to a case in which two non-contiguous CCs are used and UE $C_2$ corresponds to a case in which two contiguous CCs are used.

One DL CC and one UL CC are used in LTE, whereas a plurality of CCs may be used in LTE-A, as shown in FIG. 6. Methods for a control channel to schedule a data channel can be divided into linked carrier scheduling and cross carrier scheduling.

More specifically, according to linked carrier scheduling, a control channel transmitted through a specific CC schedules only a data channel through the specific CC as in the LTE system which uses a single CC.

According to cross carrier scheduling, a control channel transmitted through a primary CC (CC) schedules a data channel transmitted through the primary CC or another CC using a Carrier Indicator Field (CIF).

A description will be given of a method of designating positions of PDCCH candidates in a search space on the basis of the above description.

The number of CCEs configured in a predetermined subframe k is defined as $N_{CCE,k}$ and it is assumed that indexes of the CCEs are 0 to $N_{CCE,k-1}$. In this case, positions of PDCCH candidates m=0, ..., $M^{(L)}-1$ of the corresponding aggregation level L in a search space $S_k^{(L)}$ (L∈{1, 2, 4, 8}) are defined by the following expression in 3GPP.

$$L\{(Y_k+m') \bmod [N_{CCE,k}/L]\}+i$$

In [Equation 1], m' is set as m'=m in the case of common search space. If the CIF is not defined even in the case of UE-specific search space, that is, if cross carrier scheduling is not applied, m' is set such that m'=m. When the CIF is defined in the case of UE-specific search space, that is, when cross carrier scheduling is applied, m' is defined as m'=m+ $M^{(L)} \cdot n_{CI}$. Here, $n_{CI}$ denotes a CIF value.

In the case of common search space, $Y_k$ is set to 0. In the case of UE-specific search space, $Y_k$ may be defined by a hashing function as represented by Expression 2.

$$Y_k=(A \cdot Y_{k-1}) \bmod D \qquad \text{[Equation 2]}$$

In [Equation 2], A=39827, D=65537, k=$\lfloor n_s/2 \rfloor$ and $n_s$ indicates a slot index in one radio frame. In addition, an initial value may be set such that $Y_{-1}=n_{RNTI} \neq 0$ where $n_{RNTI}$ denotes a UE identifier.

In the current wireless communication environment, data throughput for a cellular network is rapidly increasing with the emergence and propagation of various devices requiring Machine-to-Machine (M2M) communication and high data throughput. To meet high data throughput, communication technology evolves to carrier aggregation for enabling efficient use of a larger number of frequency bands, MIMO for increasing data capacity within a limited frequency band, and Coordinated Multi-Point (CoMP) and communication environments evolves to environments in which the density of accessible nodes around a UE increases. A system having high-density nodes can show higher system performance according to cooperation among nodes. This scheme provides much higher performance than a scheme in which nodes operate as independent Base Stations (BSs) (which may be called Advanced BSs (ABSs), Node-Bs (NBs), eNBs, Access Points (APs), etc.).

Before a description of embodiments of the present disclosure, DL control information about an operation for a 1-ms TTI, including a PDSCH/PUSCH is referred to as DCI, whereas DL control information about shortened PDCCH/ shortened PUSCH (sPDCCH/sPUSCH) scheduling and an operation of slow DCI is referred to as shortened DCI (sDCI).

Further, (s)DCI including resource information about an sPDCCH and/or an sPDSCH may be referred to as slow DCI. The slow DCI may be transmitted on a PDCCH or an Enhanced PDCCH (EPDCCH). In addition, sDCI that schedules an sPDSCH/sPUSCH is referred to as fast DCI. The fast DCI may be transmitted on an sPDCCH. Further, a CCE for a shorted Transmission Time Interval (sTTI) is referred to as an sCCE.

Now, a detailed description will be given of a method for configuring a DL control region according to an embodiment of the present disclosure.

To satisfy requirements for a variety of application fields, a situation in which various TTIs may be configured for all physical channels or specific physical channels is under discussion in a future-generation wireless communication system. Particularly, setting of a TTI for a physical channel such as PDCCH/PDSCH/PUSCH/PUCCH to be shorter than 1 ms is considered in order to reduce latency during communication between an eNB and a UE. Hereinbelow, the physical channel PDCCH/PDSCH/PUSCH/PUCCH operating in a TTI shorter than 1 ms is referred to as shortened PDCCH/shortened PDSCH/shortened PUSCH/shortened PUCCH (sPDCCH/sPDSCH/sPUSCH/sPUCCH).

Meanwhile, the duration of a TTI may be changed to about two symbols. In this case, configuring a control region for each TTI may be inefficient in terms of control overhead, and reduce user packet throughput.

Resources for actual transmission of a control channel such as an sPDCCH carrying sDCI in a control region may be smaller than the duration of a TTI set to about two symbols. Accordingly, it is considered for the future-generation wireless communication system to use all or a part of resources unused for an sPDCCH in resources of a control region, for sPDSCH mapping.

For the convenience of description, resources unused for an sPDCCH in the resources of a control region will be referred to as unused REs.

In other words, the present disclosure proposes a method and procedure for efficiently using unused REs in a control region. In addition, the present disclosure proposes a method for configuring a search space suitable for utilization of unused REs, that is, a method for arranging sPDCCH candidates.

The following description is given in the context of an LTE/LTE-A system, for the convenience of description. In the present disclosure, the term 'TTI' may cover a regular TTI equal to 1 ms, the size of a general subframe, and an sTTI shorter than 1 ms. A TTI may be a unit of one or more OFDM symbols or SC-FDMA symbols. While an sTTI is assumed for the convenience of description, the present disclosure may also be extended to a case where the TTI is longer than the size of a subframe or equal to or longer than 1 ms. Further, it is apparent that the spirit of the present disclosure is also applicable to a system (e.g., New Radio Access Technology (RAT)) other than LTE. Characteristically, an sTTI may be introduced in such a manner that a subcarrier spacing may be increased in the future-generation wireless communication system. In the present disclosure, it is assumed that there are an sTTI (<1 ms), a normal TTI (=1 ms), and a lengthened TTI (1 TTI) (>1 ms).

Embodiment 1: Method for Using Unused REs of Control Region for sPDSCH Mapping

In a future-generation wireless communication system, particularly when the duration of an sTTI is set to about two OFDM symbols, it is under discussion to use all or a part of REs unused for sPDCCH transmission in a control region, for sPDSCH transmission, in order to reduce control overhead.

sPDCCHs may include an sPDCCH for another UE as well as an sPDCCH that schedules an sPDSCH and/or an sPUSCH. If only an sPDCCH scheduling an sPDSCH exists in a control region, all resources of the control region except for resources used for the sPDCCH may be regarded as unused REs. However, a UE may not determine whether an sPDCCH for another UE has been mapped in the control region and, if any such sPDCCH is mapped, may not determine the position of the sPDCCH for another UE. Moreover, considering that the UE may fail to detect its sPDCCH, if the sPDCCH schedules an sPUSCH, the UE may not determine unused REs accurately all the time.

It may be contemplated as a second-best solution that unused REs available for sPDSCH mapping are specified by explicitly or implicitly indicating a last sCCE index. For example, a last sCCE index used for an sPDCCH in a control region may be indicated by sDCI so that resources starting from the next sCCE may be used for an sPDSCH by rate matching and/or puncturing.

Meanwhile, to indicate the last sCCE index, a higher layer may set one or more candidate sCCE indexes and select one of the candidate sCCE indexes by sDCI, in consideration of control overhead. Or a ratio may be used. That is, remaining sCCEs obtained by subtracting the number of sCCEs estimated based on the ratio from the total number of sCCEs in the control region may be configured as a resource region available for an sPDSCH. In other words, as many sCCE indexes as the number of CCEs estimated based on the total number of CCEs and the ratio may be set as available for the sPDCCH, starting from the first sCCE index.

A method for explicitly configuring REs for an sPDSCH is to assume that an sPDCCH scheduling an sPDSCH for which unused REs of a control region are to be used includes a last sCCE. In this case, an sPDCCH for another UE or an sPDCCH for a UL grant may be mapped to an sCCE having a smaller index than the index of the last sCCE.

Meanwhile, the starting CCEs of PDCCH candidates may be different in position for different UEs according to UE RNTIs in an LTE UE-specific search space. Further, the position of the starting CCE is shifted on a PDCCH candidate basis, and the position of the starting CCE may be different according to an aggregation level. Accordingly, since PDCCH candidates may be distributed widely according to aggregation levels and/or UEs in the control region, overlap between the PDCCH candidates or obstruction of search in a PDCCH candidate region may be prevented.

In consideration of an sTTI, however, the number of sPDCCHs to be scheduled or transmitted simultaneously during one TTI may be limited. For example, if a TTI is configured to be two symbols long, as the number of UEs increases and/or an aggregation level increases, control overhead increases, thereby decreasing data throughput in spite of the use of the sTTI.

Therefore, even though a small number of sPDCCHs are mapped in a control region, if the sPDCCHs are distributed in the control region according to UEs and/or aggregation levels, unused REs are also distributed in the control region, thereby making it difficult to use the unused REs for an sPDSCH.

To avert this problem, it may be configured that the starting positions of sPDCCH candidates are not changed according to UE RNTIs and aggregation levels in the future-generation wireless communication system.

Specifically, a common starting position may be set for sPDCCH candidate sets irrespective of UEs and/or aggregation levels.

For example, the starting positions of sPDCCH candidate sets may be identical for the same aggregation level irrespective of UEs, whereas the starting positions of sPDCCH candidate sets may be different for different aggregation levels. Herein, the difference between the starting positions of sPDCCH candidate sets for different aggregation levels may be equal to or less than a predetermined value. Further, the starting positions of sPDCCH candidates may be set aggregation level-specifically or aggregation level-commonly by higher-layer signaling.

If 2-level DCI such as slow DCI and fast DCI is introduced, the starting positions of sPDCCH candidates may be indicated by slow DCI. Further, the starting position of an sPDCCH candidate set may be configured cell-specifically to mitigate interference between cells and thus avoid interference between sPDCCHs, or UE-specifically to select resources suitable for each UE.

In Embodiment 1, it is assumed that sPDCCH candidate sets start at the same position for UEs. Further, if sPDCCH candidate sets start at the same position for aggregation levels, the sPDCCH candidate sets may be configured in the manner illustrated in FIG. 9. As illustrated in FIG. 9, each of the sPDCCH candidate sets includes one or more sCCEs according to aggregation levels.

Meanwhile, in the case where unused REs available for an sPDSCH are indicated according to the method for explicitly or implicitly indicating a last CCE index used for an sPDCCH in a control region, sPDSCH resource utilization may be inefficient according to an aggregation level corresponding to a last CCE index. For example, in the case where the aggregation level corresponding to the last CCE index is 8, even though the aggregation levels of the remaining sPDCCHs are 1, lots of unused REs may not be used for sPDSCH mapping.

Therefore, a description will be given of more specific examples of a method for separating an sPDCCH transmission region from an sPDSCH available region in a control region.

1. Embodiment 1-1

In a control region, an sPDCCH transmission region is configured by means of a last CCE index and indication information about the control region, included in sDCI. Herein, the last CCE index may be indicated by sDCI that schedules an sPDSCH, and may be included in an SPDCCH carrying sDCI that schedules an sPDSCH for which unused REs of the control region may be used. The indication information about the control region, included in the sDCI may indicate an aggregation level. The aggregation level indicated by the indication information may be a reference aggregation level based on which rate matching and/or puncturing for an sPDSCH is performed, and may be configured independently of an aggregation level for an sPDCCH.

For example, it is assumed that an sPDCCH scheduling an sPDSCH includes a last CCE of an sPDCCH transmission region in a control region. Further, the starting CCE of the sPDCCH transmission region in the control region is configured according to a reference aggregation level for rate matching and/or puncturing for the sPDSCH in sDCI.

That is, the sPDCCH transmission region is configured as the region of one or more sPDCCH candidates corresponding to the aggregation level indicated by the sDCI, spanning from the starting CCE of the sPDCCH corresponding to the last CCE. For example, if the aggregation level of an sPDCCH corresponding to a last CCE is 2 and an aggregation level indicated by sDCI is 8, an sPDCCH transmission region and an sPDSCH transmission region may be defined as illustrated in FIG. 10(a).

On the other hand, if the aggregation level of an sPDCCH corresponding to a last CCE is 8 and an aggregation level indicated by sDCI is 2, an sPDCCH transmission region and an sPDSCH transmission region may be defined as illustrated in FIG. 10(b). Further, if the aggregation level of an sPDCCH corresponding to a last CCE is 4 and an aggregation level indicated by sDCI is 4, an sPDCCH transmission region and an sPDSCH transmission region may be defined as illustrated in FIG. 10(c). Finally, if the aggregation level of an sPDCCH corresponding to a last CCE is 2 and an aggregation level indicated by sDCI is 8, an sPDCCH transmission region and an sPDSCH transmission region may be defined as illustrated in FIG. 10(d).

Meanwhile, if the starting position of an sPDCCH candidate set is configured independently for each UE in Embodiment 1-1, indication information about a control region, included in sDCI may be indicated by higher-layer signaling in order to represent a wider sPDCCH/sPDSCH transmission region.

Embodiment 1-2

In a control region, an sPDCCH transmission region is configured based on indication information about a control region included in sDCI. An aggregation level indicated by the indication information may be a reference aggregation level based on which rate matching and/or puncturing for an sPDSCH is performed, and may be configured independently of an aggregation level for an sPDCCH.

Further, the number of sPDCCH candidates used in the control region may be set by higher-layer signaling or sDCI.

On the contrary, the number of sPDCCH candidates used in the control region may be fixed to a specific value. In this case, an sPDCCH transmission region and an sPDSCH transmission region may be defined in the control region, based on an aggregation level and the number of sPDCCH candidates. For example, if the aggregation level is 4 and the number of sPDCCH candidates is 2, a region corresponding to two sPDCCH candidates with aggregation level 4 from the starting position of an sPDCCH candidate set corresponding to the aggregation level may be configured as an sPDCCH transmission available region.

Meanwhile, if the starting position of an sPDCCH candidate set is configured independently for each UE in Embodiment 1-2, indication information about a control region, included in sDCI may be indicated by higher-layer signaling in order to represent a wider sPDCCH/sPDSCH transmission region.

3. Embodiment 1-3

In a control region, an sPDCCH transmission region is configured based on indication information about the control region, included in sDCI. For example, the sDCI may indicate a starting sCCE index and a last sCCE index. That is, all SCCEs of the starting sCCE index to the last sCCE index may be configured as the sPDCCH transmission region.

Embodiment 1-4

In a control region, an sPDCCH transmission region is configured by a combination of a resource region actually used for sPDCCH transmission in the control region and indication information about the control region, included in sDCI. The indication information about the control region, included in the sDCI may be information indicating how many more resources are to be used as the sPDCCH transmission region, with respect to resources carrying an sPDCCH, including the sDCI. That is, the indication information may include information indicating how many more resources are to be used as an sPDCCH transmission region, among resources before the resources carrying the sPDCCH, including the sDCI and/or information indicating how many more resources are to be used as an sPDCCH transmission region, among resources after the resources carrying the sPDCCH, including the sDCI.

The time relationship of resources with respect to the sPDCCH including sDCI may be an sCCE-domain relationship. For example, based on the assumption that a remaining sPDCCH transmission region except for the sPDCCH including the sDCI has the same aggregation level as the sPDCCH including the sDCI, how many resources to be reserved for a resource region for sPDCCHs may be determined.

Or, a specific aggregation level may be configured and how many resources to be reserved for a resource region for sPDCCHs may be determined based on the specific aggregation level. The specific aggregation level may be the maximum of allowed aggregation levels.

Meanwhile, indication information about a control region, included in sDCI may indicate the number of sCCEs or Physical Resource Blocks (PRBs). Or, indication information about a control region, included in sDCI may include a ratio so that a resource region corresponding to a specific ratio to a resource region carrying an sPDCCH including sDCI, such as twice, one, ¼, or ½ is determined to be a resource region for sPDCCH transmission.

Meanwhile, additional resources subject to rate matching for an sPDSCH except for a region used for the sPDCCH scheduling the sPDSCH may be predetermined. Herein, rate matching for an sPDSCH may be performed on the basis of a PRB or PRB set including the sPDCCH scheduling the sPDSCH. In this case, sPDCCH candidates for the same UE and/or the same aggregation level may be distributed across a total sCCE domain rather than they are concentrated in a specific region. That is, the difference between the sCCE indexes of adjacent sPDCCH candidates may exceed 1.

In the foregoing embodiments, however, a part configured as an sPDSCH transmission region in a control region may be used as a region for sPDSCH transmission by rate matching or puncturing. Further, rate matching may be performed in units of an sCCE or in units of a PRB or PRB set including sCCEs corresponding to the sPDCCH transmission region.

For example, a PRB may include a plurality of sCCEs, and one sCCE subject to rate matching may exist in the PRB. In this case, even though the remaining REs of the PRB including the corresponding sCCE are not used for actual sPDCCH transmission, the REs may be subject to rate matching for an sPDSCH transmission region.

Embodiment 2: Method for Configuring sPDCCH Candidates in Control Region

In the case where sPDCCH candidate sets with different aggregation levels have the same starting sCCE index as illustrated in FIG. 9, combinations of the number of sPDCCHs that may be transmitted simultaneously and/or an aggregation level may be limited.

For example, in the case where an sPDCCH transmission region is configured based on a last sCCE index in a control region, if the aggregation level of an sPDCCH scheduling an sPDSCH for which unused REs of the control region may be used is configured to be smaller than the aggregation level of an sPDCCH for another UE or an sPDCCH for a UL grant, the corresponding method may not be viable. That is, if the aggregation level of a UL grant is 8 and the aggregation level of a DL assignment is 1 or 4, the above method may be restricted.

This restriction may be relieved by modifying the method for configuring an sPDCCH candidate set in a control region. For example, as illustrated in FIG. 11, the centers of sPDCCH candidate sets for different aggregation levels are aligned with one another. The alignment between sPDCCH candidate sets as illustrated in FIG. 11 may be configured by higher-layer signaling. If a 2-level DCI-based scheduling scheme is used, the alignment type of sPDCCH candidate sets as illustrated in FIG. 11 may also be indicated by slow DCI.

Meanwhile, an sPDCCH transmission region and an sPDSCH transmission region may be defined in a control region by use of sPDCCH candidate sets aligned as described above and an information indicator related to a control region, included in sDCI.

That is, a transmission region may be configured differently in an sCCE index part before the center line of an sPDCCH candidate set (i.e., an area to the left of the center line) and an sCCE index part after the center line of the sPDCCH candidate set (i.e., an area to the right of the center line).

Regarding the right area, a region from the center line to the last sCCE index used for transmission of an sPDCCH scheduling an sPDSCH for which unused REs of the control region may be used is configured as an sPDCCH transmission region. Then, regarding the left area, an sPDCCH transmission region is configured based on information related to the control region, indicated by sDCI. For example, the information may indicate the number of sCCEs in the left area from the center line to be determined as an sPDCCH transmission region.

Specifically, the number of sCCEs determined as the sPDCCH transmission region in the left area may be an aggregation level. Further, the area of as many sPDCCH candidates as the aggregation level may be configured as an sPDCCH transmission region. If a center line is set independently for each UE, the aggregation level or the number of sCCEs may be changed by higher-layer signaling.

Figure 12:
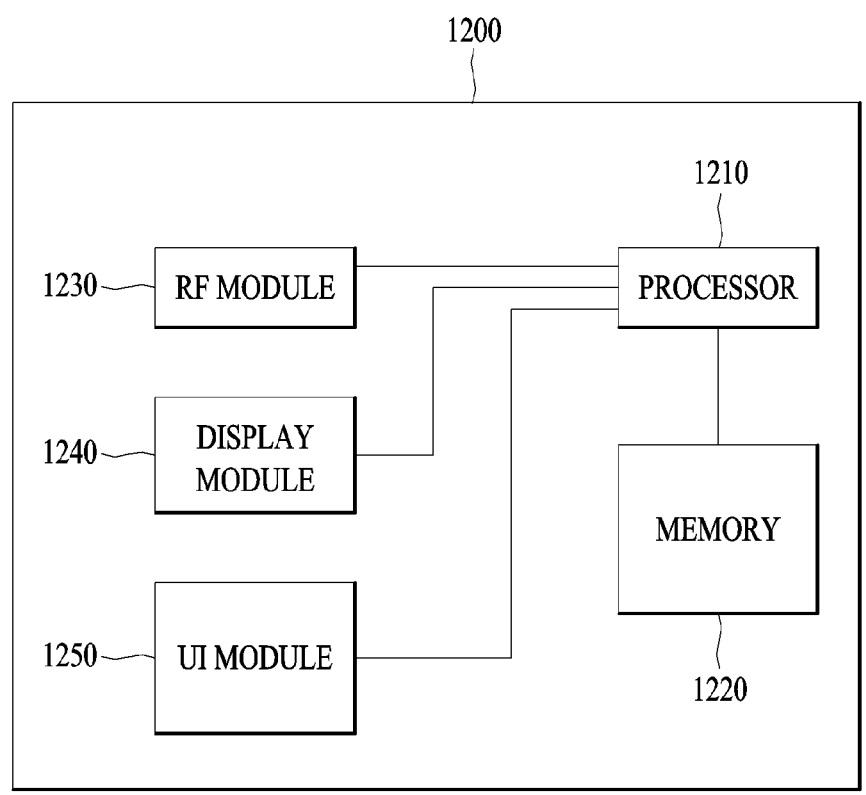
FIG. 12 is a block diagram of a communication apparatus according to an embodiment of the present disclosure.

FIG. 12 is a block diagram of a communication apparatus according to an embodiment of the present disclosure.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present disclosure described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

As is apparent from the foregoing description of the present disclosure, actual resources used for transmission of control information may be mapped efficiently, and unused REs of a control region may be used for sPDSCH mapping, during scheduling of a control region and a data region in an sTTI. As a consequence, data throughput may be increased.

While the method and apparatus for configuring a DL control region in a wireless communication system supporting an sTTI have been described above in the context of a 3GPP LTE system, they are also applicable to various wireless communication systems other than the 3GPP LTE system.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the method for transmitting uplink control information in a wireless communication system and the apparatus for the same have been described based on the 3GPP LTE system, the method and the apparatus may be applied to various wireless communication systems in addition to the 3GPP LTE system.

What is claimed is:

1. A method for receiving a downlink control channel and a downlink data channel by a user equipment (UE) in a wireless communication system, the method comprising:
   receiving a short physical downlink control channel (PDCCH) including downlink control information (DCI),
   wherein the DCI includes first information on an aggregation level being a reference for allocating the downlink data channel to a control region and second information on a last control channel element (CCE) index to which the downlink control channel is allocated, and
   wherein the last CCE index is a last index among a plurality of CCE indices for a plurality of candidate CCEs allocated for the downlink control channel;
   configuring a downlink control channel transmission region based on the last CCE index and a resource region for one or more downlink control channel candidates related to the aggregation level;
   configuring a remaining control region except for the downlink control channel transmission region as a downlink data channel transmission region; and
   receiving the downlink control channel and the downlink data channel in the control region, based on the configured downlink control channel transmission region and the configured downlink data channel transmission region.

2. The method according to claim 1, wherein a starting position of the downlink control channel transmission region is the same irrespective of aggregation levels for sPDCCH candidate sets for the downlink control channel.

3. The method according to claim 1, wherein a center position of the downlink control channel transmission region is the same irrespective of aggregation levels for sPDCCH candidate sets for the downlink control channel.

4. The method according to claim 1, wherein the plurality of candidate CCEs are indicated by higher-layer signaling.

5. The method according to claim 1, wherein the last CCE index is one of a plurality of CCE indexes for the sPDCCH including the DCI.

6. A user equipment (UE) for receiving a downlink control channel and a downlink data channel in a wireless communication system, the UE comprising:
   a transmitter and a receiver configured to transmit and receive wireless signals to and from a base station; and
   a processor operatively coupled to the RF unit, and configured to:
   receive a short physical downlink control channel (PDCCH) including downlink control information (DCI),
   wherein the DCI includes first information on an aggregation level being a reference for allocating the downlink data channel to a control region and second information on a last control channel element (CCE) index to which the downlink control channel is allocated, and
   wherein the last CCE index is a last index among a plurality of CCE indices for a plurality of candidate CCEs allocated for the downlink control channel,
   configure a downlink control channel transmission region based on the last CCE index and a resource region for one or more downlink control channel candidates related to the aggregation level,
   configure a remaining control region except for the downlink control channel transmission region as a downlink data channel transmission region, and
   receive the downlink control channel and the downlink data channel in the control region, based on the configured downlink control channel transmission region and the configured downlink data channel transmission region.

7. The UE according to claim 6, wherein a starting position of the downlink control channel transmission region is the same irrespective of aggregation levels for sPDCCH candidate sets for the downlink control channel.

8. The UE according to claim 6, wherein a center position of the downlink control channel transmission region is the same irrespective of aggregation levels for sPDCCH candidate sets for the downlink control channel.

9. The UE according to claim 1, wherein the plurality of candidate CCEs are indicated by higher-layer signaling.

10. The UE according to claim 6, wherein the last CCE index is one of a plurality of CCE indexes for the sPDCCH including the DCI.

* * * * *